US011027662B2

(12) United States Patent
Morgan et al.

(10) Patent No.: US 11,027,662 B2
(45) Date of Patent: Jun. 8, 2021

(54) SUPPORT RACK

(71) Applicants: Jason Morgan, Wake Forest, NC (US);
Ron Morrison, Morrisville, NC (US)

(72) Inventors: Jason Morgan, Wake Forest, NC (US);
Ron Morrison, Morrisville, NC (US)

( * ) Notice: Subject to any disclaimer, the term of this patent is extended or adjusted under 35 U.S.C. 154(b) by 0 days.

(21) Appl. No.: 16/662,709

(22) Filed: Oct. 24, 2019

(65) Prior Publication Data

US 2020/0130600 A1 Apr. 30, 2020

Related U.S. Application Data

(60) Provisional application No. 62/749,964, filed on Oct. 24, 2018.

(51) Int. Cl.
*B60R 9/06* (2006.01)
*B60R 11/00* (2006.01)

(52) U.S. Cl.
CPC ........... *B60R 9/06* (2013.01); *B60R 2011/004* (2013.01); *B60R 2011/0052* (2013.01); *B60R 2011/0075* (2013.01)

(58) Field of Classification Search
CPC ...................................................... B60R 9/06
USPC .......................................... 224/42.12, 42.13
See application file for complete search history.

(56) References Cited

U.S. PATENT DOCUMENTS

| 9,333,822 | B1 * | 5/2016 | LaFave | B60R 9/10 |
| 9,352,698 | B2 * | 5/2016 | Romanelli | B60R 9/06 |
| 9,623,807 | B2 * | 4/2017 | Singleton | B62D 43/02 |
| 9,718,411 | B2 * | 8/2017 | Field, Jr. | B60R 9/065 |
| 2005/0082329 | A1 * | 4/2005 | Cohen | B60R 9/10 224/519 |

FOREIGN PATENT DOCUMENTS

JP 08108809 A * 4/1996

* cited by examiner

*Primary Examiner* — Scott T McNurlen
(74) *Attorney, Agent, or Firm* — Olive Law Group, PLLC; Daniel I. Becker (57) ABSTRACT

A cargo and storage rack for increasing the carrying capacity of a vehicle having a spare tire mount on the exterior of the vehicle. Retaining features of a mounting boss engage the retainment features of the spare tire to the spare tire mount. The mounting boss is adapted to receive storage brackets above or below or both of above and below the mounting boss, to secure cargo securing features at desired distances of engagement from the boss. Rails of any bracket secured to the boss provide support for alternately translating and selectably locatable cargo supporting features, such that the rack can secure cargo without a bracket that provides its own securing features. Optionally, the rack can support cargo with any combination of selectably locatable cargo supporting features on the rails and a bracket, and the rack comprises methods of construction and customization that facilitate rapid reconstruction of the rack and removal from the vehicle.

7 Claims, 9 Drawing Sheets

SUPPORT RACK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

This application claims the benefit of U.S. Provisional Application No. 62/749,964, filed Oct. 24, 2018, titled "SUPPORT RACK".

FIELD

At least some embodiments disclosed herein relate, in general, to spare tires, spare tire mounts, exterior vehicle accessories, storage racks, rail-mounted supports, and vehicle lighting.

BACKGROUND

A variety of vehicles retain a spare tire with a permanent exterior mount on the rear doors of the vehicles. Especially popular with vehicles having significant ground clearance, the combination of the ground clearance and mounting the tire to the rear of the vehicle (because it assists maximizing departure angles) results in a vehicle with compromised storage capacity and access to storage, when compared to vehicles of similar size.

Such vehicles can best take advantage of their mechanical configuration on off-roading trips. Paradoxically, however, going on such trips can easily consume the relatively small storage capacity which results from the configuration. To deal with the compromise, there have been many attempted solutions to provide additional storage on the exterior of the vehicle. Some of these racks and containers attached to tow hook hitches, roof racks, the rear door or hatch of the vehicle, and even on the hood.

The spare tire itself is a difficult place to mount objects because it affords few places to securely mount cargo and is a bulky shape which obstructs accommodation of significant airspace volumes around the tire. Prior solutions attempting to support cargo in the vicinity of the spare tire result in massive exterior space consumption with limited usefulness, relative to the effort required to remove or alter the installation. Increased effort with respect to easily returning the vehicle to an unencumbered state, frustrate the ease of using the vehicle for purposes that would otherwise benefit from the advantages of its construction, such as off-road driving.

There is a persistent need in the art to better exploit the spare tire and surrounding areas for cargo support, without burdening such areas with such space consuming equipment as to frustrate the ability to easily access the vehicle's capabilities.

Further, there is a need for such a versatile solution to accommodate customization to a desired type of storage that meets the specific needs of a particular user of the vehicle.

SUMMARY

The present invention provides a support rack that is supported by the retaining features of a vehicle having a rear-exterior-spare-tire-mount. Its embodiments provide useful storage space in the vicinity of the rear tire and is easily removable. Further, the rack is fully customizable to support a variety of configurations, such that it is readily able to accommodate the specific needs of a particular user of the vehicle.

The various embodiments of the invention are adapted to mount to the mounting hardware (the lugs or other retaining features or probosces of the vehicle's spare tire mounts) that supports and retains the spare tire. It then affixes and supports on the hardware a mounting boss that locates rails, the rails being elongate members that are alternately insertable and translatable relative to the mounting boss, such that the rails are adapted to provide support for accessories and other forms of cargo and cargo support. Such accessories include at least accessory brackets above and below the mount, in a desired quantity and arrangement of brackets, as desired by a user of the vehicle. For example, the mounting boss locating an upper accessory bracket above the boss, and a lower accessory bracket below the boss, where the upper and lower brackets integrally provide plural rails.

To further the versatility of the system, the rails connecting the mount to cargo supporting features (such as upper and lower brackets, above) support translating and selectably-locatable rail hangers. Some contemplated exemplary rail hangers are adapted to articulation about the rails angularly and along the length of the rails. Thereby, cargo can either be suspended or supported by any combination of any bracket (in isolation), any combination of plural brackets, any combination of a bracket and rail hangers, and any arrangement of rail hangers, in isolation from cargo being supported by a bracket.

Contemplated fasteners for the brackets relative to the amount and the hangers relative to the brackets' rails are all easily released, so that the rack can be reduced to fewer brackets or hangers, merely the mounting boss, or even completely removed, very rapidly. Many contemplated embodiments are even adapted to such rapid reduction entirely without tools.

BRIEF DESCRIPTION OF THE DRAWINGS

The embodiments are illustrated by way of example and not limitation in the figures of the accompanying drawings in which like references indicate similar elements.

FIG. 11 shows a front elevation view of a storage rack embodiment of the present invention.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The following elements are a list of several features that appear in the drawings, but the list is provided for clarity and brevity, and the embodiments depicted, which include the listed elements, are merely exemplary embodiments of the invention. Neither the list of elements nor the drawings in the figures are a comprehensive or limiting set of elements of every contemplate embodiment of the invention. The drawings and the elements shown therein are merely included in several exemplary embodiments of the invention shown in said drawings:

001 Upper accessory bracket
002 Lower accessory bracket
003 Mounting boss
004 Cover
005 Rail hanger
006 Screw
007 Locking pin
008 Pad, foam pad
009 Upper basket bracket,
010 Lower basket bracket,
011 Set screw
012 Hanging accessory frame
013 Tethered accessory bracket
014 Table
015 Jerry can/fluid container
016 Panel enclosure Referring now to FIGS. 1, 2, 3, 4A-C, 6, and 7A-B, what is shown among them are several exemplary embodiments of the present invention that are in entirely functional arrangements. All of these figures' embodiments are shown in views that comprise at least the following components, in common:

A mounting boss (003; obscured in 4B-C), upper accessory bracket (001, FIGS. 1-4C, 7A-B; present in the form of an upper basket bracket 009 in FIG. 6) and lower accessory brackets (002, FIGS. 1, 2, 3, 4A-C, 6, 7B; obscured in FIG. 7A.) and plural rail hangers (each marked 005). The exemplary mounting boss 003 in these figures is shown as a plate that has mounting features (see FIG. 2) on a central region and two laterally spaced rail tubes, arranged on opposite sides of the central region. The accessory brackets (001, 002) in these embodiments comprise a bent-metal-tube construction, such that each comprises two elongate sections which are parallel to one another, and which are spaced at the same distance as to be axially alignable with the tubes of the mounting boss. These elongate sections are rails. Because of the arrangement of the tubes and/or brackets, the rails are each insertably translateable with respect to the rail tubes, and rails inserted from one side of the tubes are insertable and selectably locateable at depths of desired distance, independently of the depth of insertion of tubes inserted from another side of the tubes.

Also appearing in each of FIGS. 1, 2, 3, 4A-C, and 7A-B are rail hangers 005. These rail hangers are individually able to be applied to a rail (any of the rails of either bracket (001, 002) and are alternatively moveable by translation or are selectably locateable at any lengthwise position along the length of the specific rail and angular position about the specific rail.

Referring now to all of the FIGS. 1-7B, the rail hangers 005 shown are merely exemplary rail hanger embodiments that are secured to their respective locations with set screws. This should not be considered as limiting upon alternative embodiments to achieve the same function of the rail hangers, as to being alternatively translatable and selectably located. Contemplated embodiments comprise alternative structures and features (such as cotter pins, spring-pins, clamps, quick release pins, clasps, buckles, and straps) that are known in the art to allow similar functionality.

Also common to all of the rail hangers 005 shown in the drawings is the construction that comprises a vertical accessory support pin that is commonly shown as located outside the space between the rails. In many contemplated embodiments of the present invention which have such rail hangers, the rail hangers are optionally usable. The narrow and angularly offsettable construction which supports the vertical accessory support pin allows for the hangers to be angularly set out of the way of any accessory that might benefit from fitting against the rails (with respect to contact with the rails on a frontmost plane of the rails, parallel to the face of the tire (see FIG. 3)), without needing to be removed from the rail.

However, with the symmetric profile of a vertical, cylindrical, pin, parallel to the length of the rails, these rail hangers are each also capable of being angularly swiveled about the rails, such that they can extend forward, away from the face of the tire, such that the pins are closer together or located further away from the face of the tire. In such a position, supporting cargo or objects which would otherwise put a significant torque on the hangers, about the rails, can be eliminated by swiveling the hangers to an angle which aligns the cargo to load the rails without imposing a torque on the set screw or the rails.

Once swiveled and translated to the desired position and arrangement, then the set screws can be tightened to contact the face of the respective rails at the specific position, equally-well as at any other position or angle, without any other specific feature or shape for the rail, at which the screw would contact the rail.

The commonality of the rail hangers 005 to have such the construction shown in these figures is merely exemplary geometry that achieves a desired embodiment of function of the present invention and should not be considered limiting upon the broadest scope of the invention. Alternative contemplated embodiments also comprise alternative shapes for rail hangers, alternatively shaped or arranged pins, alternative geometries or features that are attachable to the hangers, other than vertical pins (such as holes, eyelets, hooks, screws, bolts, straps, buckles, tie downs, eye-screws, cleats, etc.), and hangers which are alternately secured (bolts, Velcro, clamps, cotter pins, quick release pins, aligned teeth or slots, straps, etc.).

Also, while set screws are excellent for providing hangers with the ability to translate and rotate about the rails and be secured at any such alternative angular and lengthwise positions on the rails, set screws are merely exemplary and non-limiting.

In FIGS. 1-4C, 6, and 7B the lower accessory bracket 002 can be seen to comprise a foam pad 008. The pad is an optional aspect of this geometry. The pad 008 is selected for properties such that soft or rounded or differently-cornered or irregularly-shaped objects can be placed thereon, without being damaged by contact with the bracket. In these embodiments, where the lower bracket 002 comprises merely bent-tube construction, the pad 008 is a useful detail of such embodiment, to prevent the relatively small contact area of the horizontal sections of the lower bracket 002 from creating undesirable stress concentrations on such cargo. Alternative embodiments for brackets may be constructed with alternative geometry or contact area, to alleviate such damage. For example, see basket bracket embodiments in FIGS. 5, 6, 8, 9.

Figure 1:
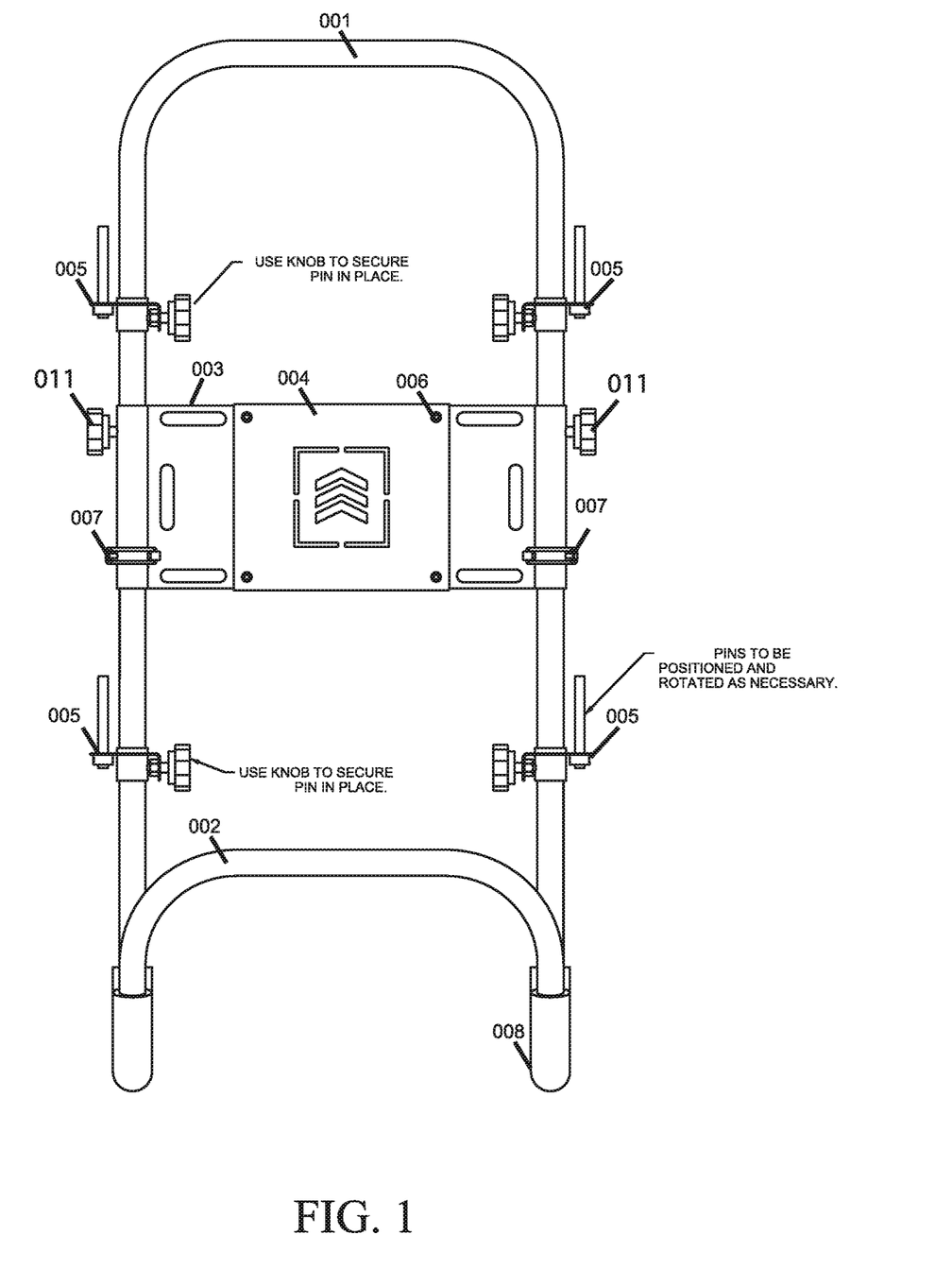
Figure 2:
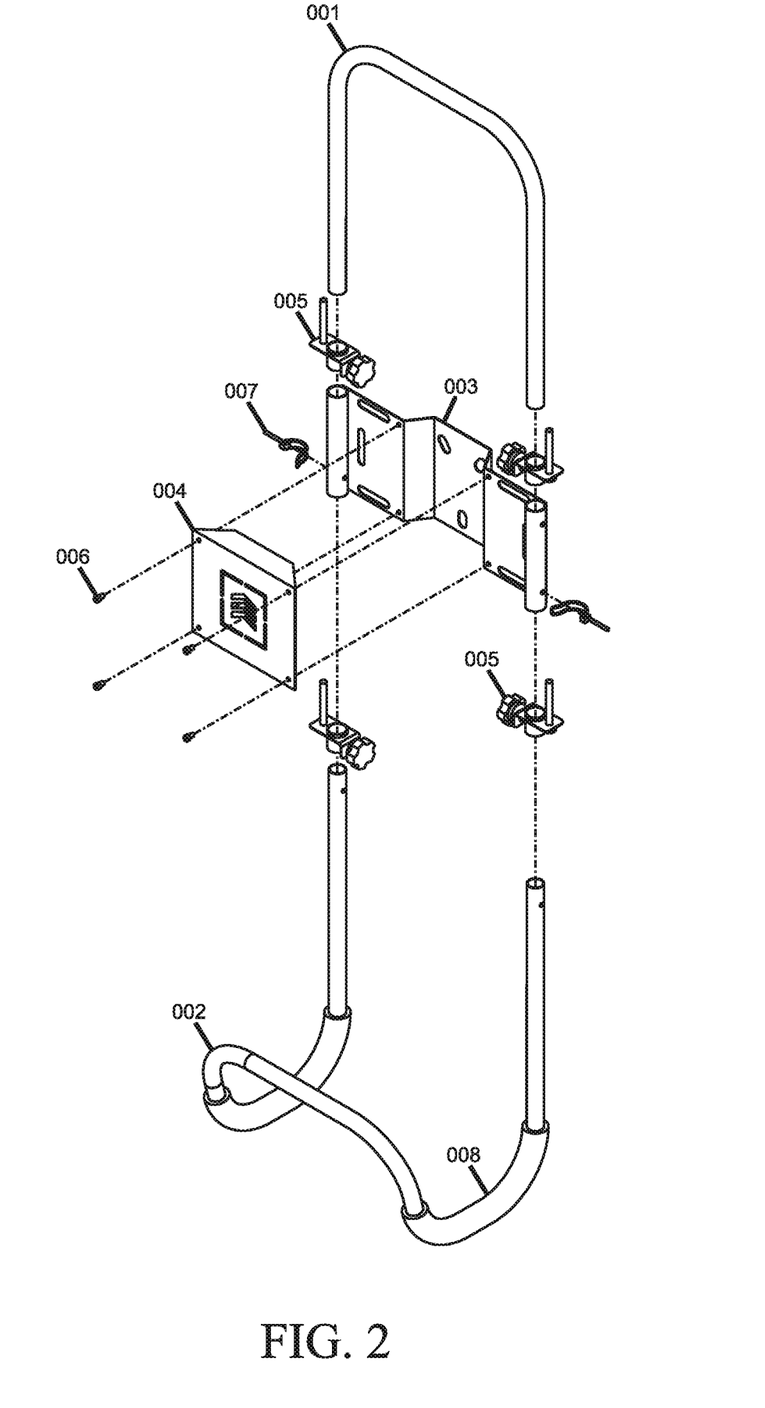
FIG. 2 shows a perspective exploded view of a storage rack embodiment of the present invention.

Referring now to FIG. 2, one embodiment of mounting features is visible on the central region of the plate. Here, the mounting features are three elongate slots arranged to match the locations of plural bolts of the multi-bolt pattern of a typical spare tire wheel and corresponding spare tire mount. This mounting arrangement is particularly well suited for vehicles having a spare tire and spare tire mount with a bolt pattern of a wheel with 5 mounting studs or bolts. "Bolt pattern" is a metric referring to the number of lugs nuts or studs necessary to mount the wheel, and the diameter of a circle on which the nuts or studs are spaced circumferentially.

In the case of a Jeep Wrangler (and its predecessors of different name), an exemplary vehicle model anticipated as compatible with the depicted embodiment, the bolt pattern has varied over several generations, from 1955-2018, including: 114.3 mm, 127 mm, and 139.7 mm. All, however, used 5 lugs, and therefore are arranged at 72 degrees about the wheel center. Each of these models comprises a rear tire mount with the respective bolt pattern for its specific wheels. This way, the same mounting features of this plate embodiment of a mounting boss 003 are able to be used with any of the mounts of any of the Wrangler bolt patterns (or any 5-lug bolt pattern), without adjustment.

The Wrangler (and other off-road-capable vehicles) is a vehicle which has an enormous quantity of aftermarket equipment to alter its drivetrain. This aftermarket of replacement equipment includes replacement wheel hubs having bolt pattern diameters which significantly differ from the original specifications. In the case of a Wrangler with hubs having such alternative bolt circle diameters (for example, 140 mm), then the wheels and correspondingly-spaced bolts of the spare tire mount would also have larger diameters. Therefore, in addition to the depicted embodiments being compatible with 5-lug wheels of any size, with this type of elongate-slot mounting features, the same embodiment can be used with any user's same Wrangler, both before and after making modification to differently sized hubs, without any modification to the present invention.

Also contemplated are alternative types of mounting features (not shown) which compensate for a change in quantity of lugs, such as embodiments which are otherwise similar to those shown in FIG. 2, including alternative patterns of elongate slots or differently assembled plate-style mounting bosses which comprise multiple sets of elongate slots, to accommodate bolts spaced at angles other than 72 degrees from one another. In the case of a 6 bolt wheel, for example, the mounting features might also include a vertical fourth slot that is vertically-aligned with the horizontal position of the lower slot, and a 5th slot, which is arranged at a 60 degrees angular offset from the lower slot.

Also contemplated are embodiments which are compatible with vehicles having features that unusually extend through where the mounting boss (003, FIGS. 1-7B) would be located. For example, the 2018 Jeep Wrangler, locates its federally mandated reversing camera on a proboscis which extends from the spare tire mount, and passes through the center of the spare tire. This position would interfere with the lug-slots-only, plate-version of the boss 003 shown in FIG. 2. Alternative contemplated embodiments of mounting bosses would therefore allow a hole or other means of allowing the proboscis to extend through the boss (plate-type or otherwise), without obstruction by the plate or other features.

Figure 3:
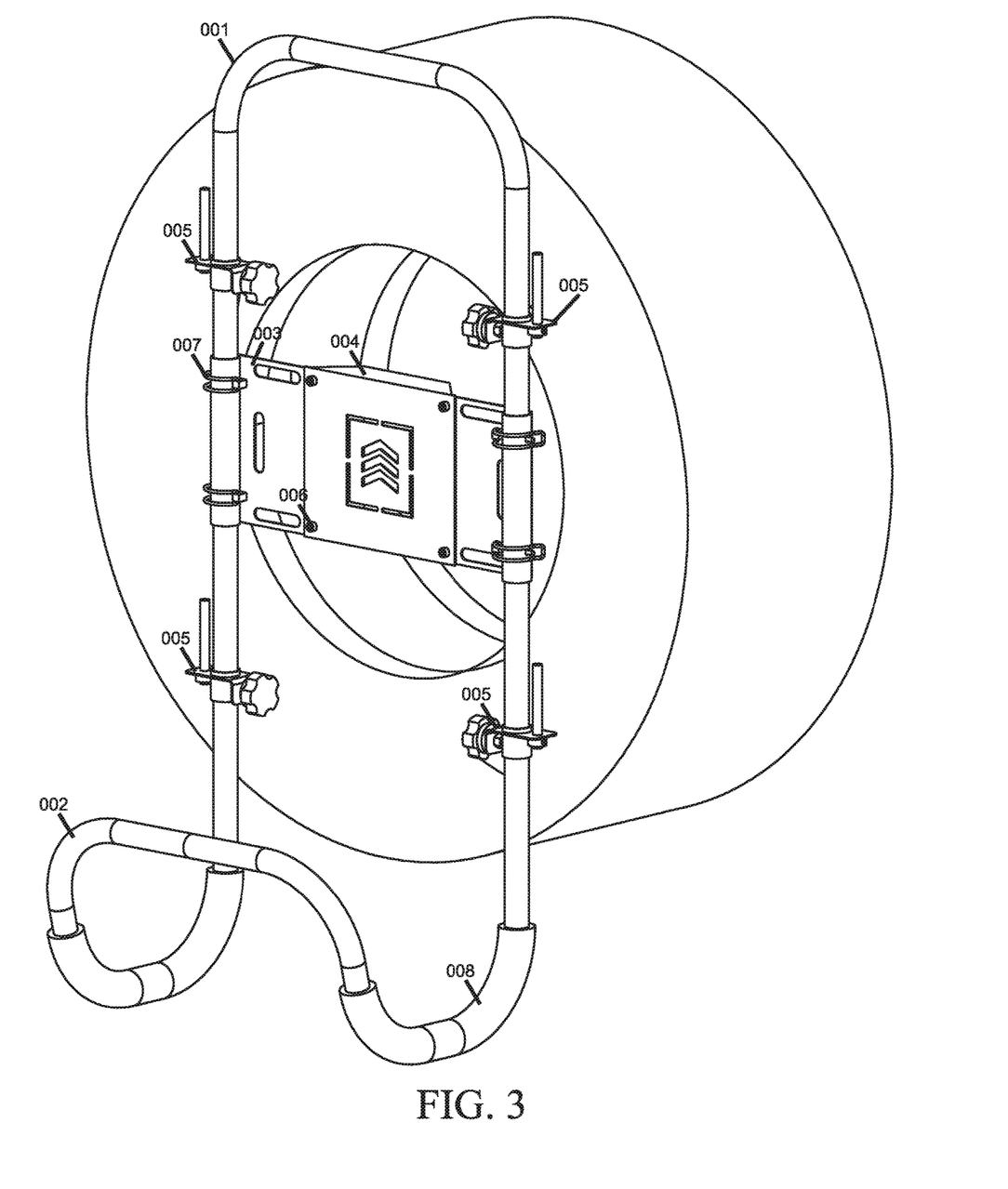
FIG. 3 shows a perspective view of a storage rack embodiment of the present invention, as installed relative to a spare tire.

Referring now to FIG. 3, what is shown is an embodiment of the present invention as described similarly above, as installed on the spare tire mount of the vehicle, outboard of the spare tire. In front of the mounting boss 003 is a cover plate 004. This plate comprises a third brake light, supplemental-to or as a replacement-for the vehicle's originally-installed third brake light. Having a redundant brake light increases visibility to other drivers, but as replacement, the brake light is especially valuable to many vehicles having a re-located spare tire mount. Relocated spare tire mounts have been attached to a wide variety of vehicles, but are presently most common on several vehicles which are well-tailored to driving on uneven services, and specifically in off-Road contexts where approach and departure angles and ease and speed of access to a replacement tire are a higher priority than access to rear cargo areas, aerodynamics, visibility, center of gravity, or moment of inertia, or overall length.

For such vehicles, in many applications, it is desirable to use a taller rolling-diameter tire. In either case, the tire is more likely to obstruct the vehicles' originally-manufactured center high mounted stop light (CHMSL). Previous solutions to such obstructions include light fixtures which bolt to the mount and which shine a light through the spokes of the spare tire's wheel or enlarged brackets which relocate the light to a higher position, to clear the height of the aftermarket equipment arrangement. Lights that shine through the spokes of the wheel have the disadvantage of a narrower angle of view and limit the overall size and output of such lights, compared to the original CHMSL. Replacement lights which continue to locate the light above the tire, but at a higher position, only further-injure the rear visibility, even beyond the effect caused by the higher upper-bounds of the relocated or up-sized tire. By contrast, locating the light of the present embodiment in this position does not prevent the use of typical examples of the above-described equipment, upsized tire or relocated mount, while moving the light to a position which is closer to following traffic, and which has a similarly wide field of view as the original lamp.

In the case of mount-proboscis-mounted features extending through the wheel center (such as the rearview camera of the 2018 Jeep Wrangler, described above), contemplated embodiments of the present invention include ones which locate the light (of the cover plate 004) and/or the cover plate 004 in an offset-position, relative to depicted position, centered on the boss 003. These include variations of the boss 003 and plate 003 that provide an opening or other conduit or path aligned with the position of the proboscis, such that the proboscis can extend beyond the cover plate, so as not to interfere with such proboscis-mounted features.

Beyond stylistic and lighting-value, the cover plate 004 is useful to protect the rack against theft of both itself and the spare tire. The cover plate 004 shown here (also FIGS. 1, 2, 4A, five, six, 7A) attaches to the mounting boss/plate 003 with screws 006. Ordinary screws provide some security, as it adds an additional layer of fasteners to be removed, but embodiments using locking or tamper-resistant screws, or other fasteners are compatible with the depicted installation method and are thereby able to further increase the security of the present invention and spare tire.

Figure 4A:
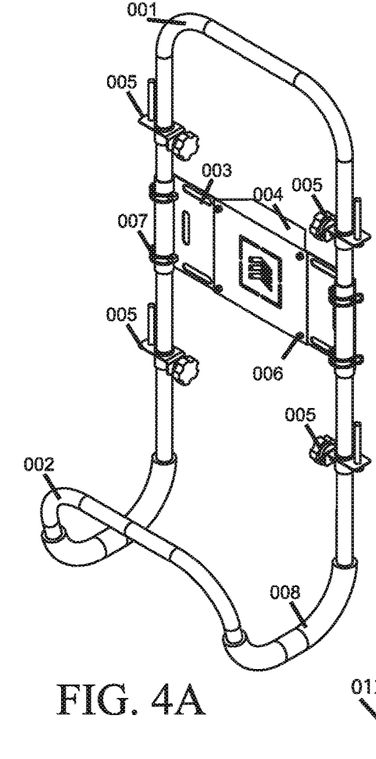
FIG. 4A shows a perspective view of a storage rack embodiment of the present invention.
Figure 4B:
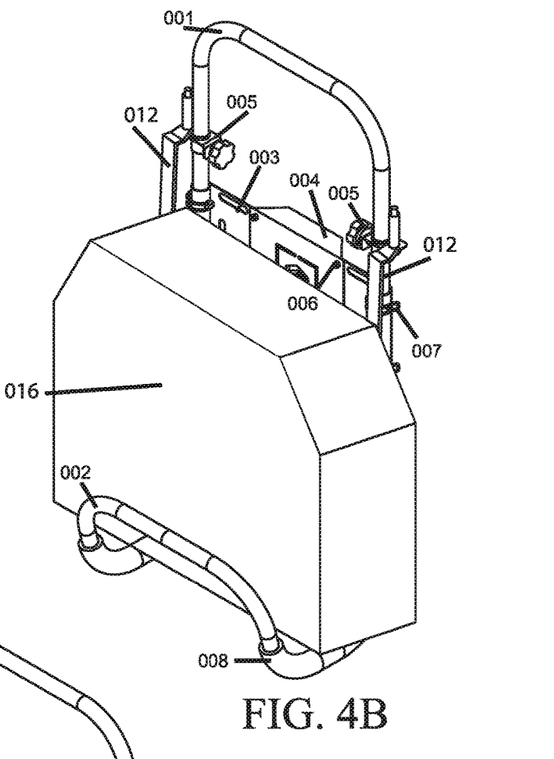
FIG. 4B shows a perspective view of a storage rack embodiment of the present invention, as loaded with a storage container supported by rail hangers and an accessory bracket.

Referring now to FIGS. 4A-C, what is shown are similar-perspective views of embodiments which are similar to those described above, but wherein FIGS. 4B and 4C comprise cargo supported on the hanger brackets 005. In FIG. 4B, there is shown a panel-enclosure 016. Several vehicles having a rear-mounted spare tire mount comprise removable panels, such as the forward-roof-panels of the "freedom top" of the 2018 Jeep Wrangler. These panels are small enough that they can be arranged inside the vehicle, but they consume a significant amount of storage space. The panels are able to be stored in a weather-resistant enclosure/bag, but these only further consume interior space, and there is not an easy way for this bag to be attached to the exterior of the vehicle.

In FIG. 4B, a panel-enclosure 016 is supported at the bottom by sitting on the lower-accessory bracket 002, with its weight distributed by the soft pad 008, to prevent damage to the roof panels through the soft enclosure. The upward-hook shape of the lower bracket 002 also prevents the lower part of the enclosure 016 from sliding or falling away from the rear of the vehicle.

The enclosure 016 is supported at the top with a hanging accessory feature 012. The hanging accessory feature 012 is supported by two rail hangers 005 that are located on the rails of the upper bracket 001. In this position, while the lower bracket 002 prevents translation away from the vehicle and is the primary support against the weight of the enclosure 016 falling, the hanging accessory feature 012, via the rail hangers 005, is able to limit the enclosure 016 from tipping away from the spare tire, or swinging or falling laterally off of the horizontal regions of the lower bracket 002.

Figure 4C:
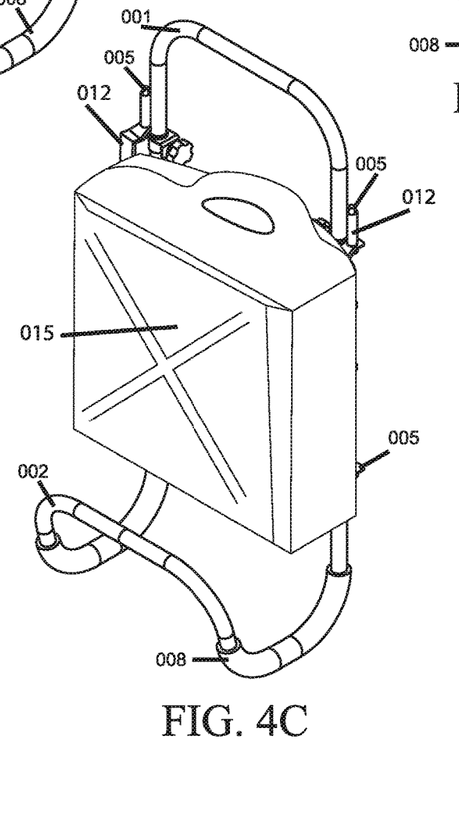
FIG. 4C shows a perspective view of a storage rack embodiment of the present invention, as loaded with a jerry can-style fluid container, as supported by plural sets of rail hangers.
Figure 5:
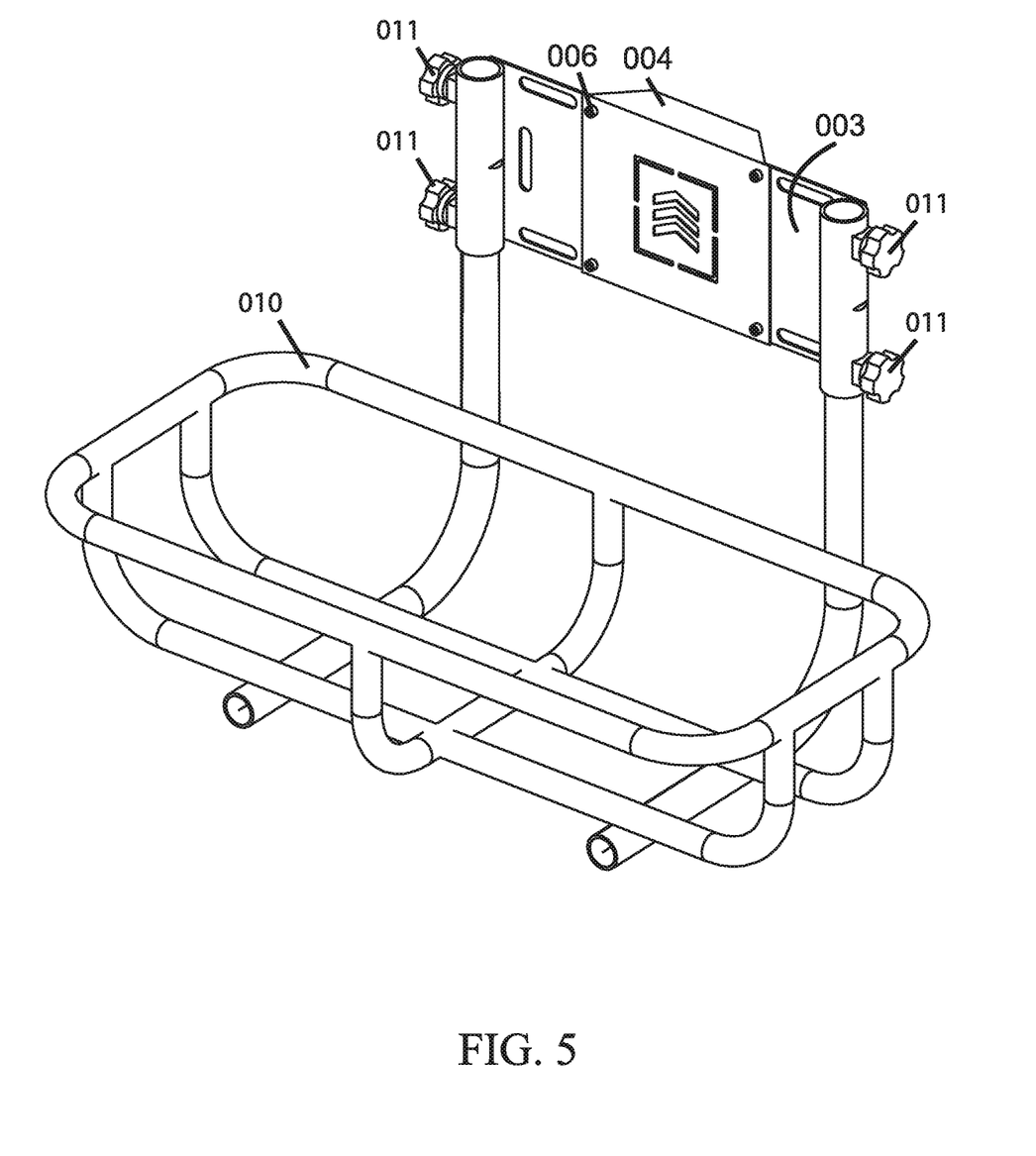
FIG. 5 shows a perspective view of a storage rack embodiment of the present invention, including an exemplary mounting boss and accessory bracket that comprises a basket.

Referring now to FIG. 4C, what is shown is an alternative use of hanging accessory features 012. Here, a fluid storage or "Jerry can" container 015 is supported on rail hangers 005 securely located on the rails of both of the upper bracket 001 and lower bracket 002. Here, none of the weight of the container 015 is supported by the horizontal section of the lower bracket 002. Instead, the top of the container 015 engages the hanging accessory feature 012 vertically (similarly to FIG. 4B), while its bottom is supported by the rail hangers 005 on the rails of the lower bracket 002.

Alternately, it is contemplated that a similar hanging accessory feature 012 may be used at the lower end of the container 015, to provide support with the rail hangers 005, but is not shown here. Also contemplated is that such a container could be directly supported on the rail hangers 005, without a hanging accessory feature 012, but that is not shown here.

Referring now to FIGS. 5, 6, 8, and 9, what are shown in common are exemplary embodiments of the present invention, comprising alternative basket bracket embodiments to the upper and lower accessory brackets (001 and 002) shown in FIGS. 1-4C and 7A-B. The exemplary upper basket bracket 009 (FIGS. 6, 9) is an exemplary alternative upper bracket to upper accessory bracket 001. The exemplary lower basket bracket 010 (FIGS. 5, 8) is an exemplary alternative upper bracket to upper accessory bracket 002.

As discussed above, with respect to FIG. 4B, the pad 008 on the hook-shaped lower accessory bracket 002 supports the enclosure 016 against stress concentration-damage, and against sliding or swinging off of the horizontal regions of the bracket 002. In the case of the upper basket bracket 009 and lower basket bracket 010 shown in these figures, the same advantages are provided by an increased number of tubes, providing greater surface area of contact. Basket brackets 009 and 010 also provide and peripheral containment, rather than relying upon by friction and stress-distribution of the pad 008.

The increased number of tubes of the lower basket bracket 010, relative to bracket 002, also gives more options for a user to wrap or strap or chain cargo against movement. Upper basket bracket 009 provides the advantages of the lower basket bracket 010 to the space above the spare, whereas upper bracket 001 does not offer a horizontal support surface at all.

Figure 6:
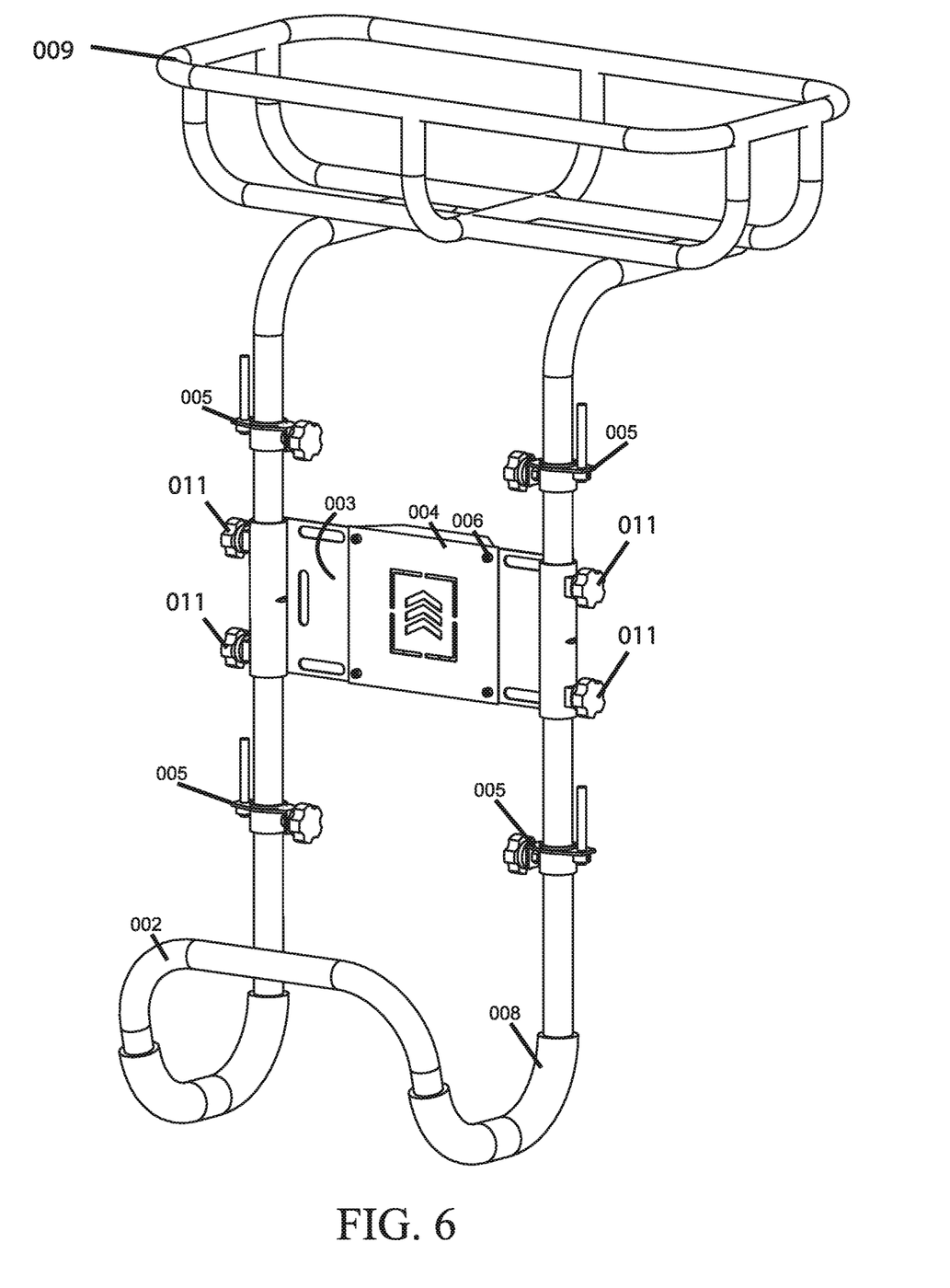
FIG. 6 shows a perspective view of a storage rack embodiment of the present invention, comprising an exemplary accessory bracket that comprises a basket.

Referring now to FIG. 6, what is shown is an assembled functional embodiment of the present invention, comprising an upper basket bracket 009. On the rails of the upper basket bracket 009 are two rail hangers 005. Because the basket brackets 009 (also FIG. 9) and 010 (FIGS. 5, 8) retain parallel rails, they are thereby able to preserve the ability to support rail-hangers 005 shown in other figures, as installed on brackets 001 and 002.

Beyond the present figures, both the depicted brackets and other contemplated brackets and rails are able to support a wide variety of alternative storage and supports and accessories. Contemplated exemplary alternatives comprise at least toolboxes, weatherproof containers, coolers, and trunks.

Figure 7A:
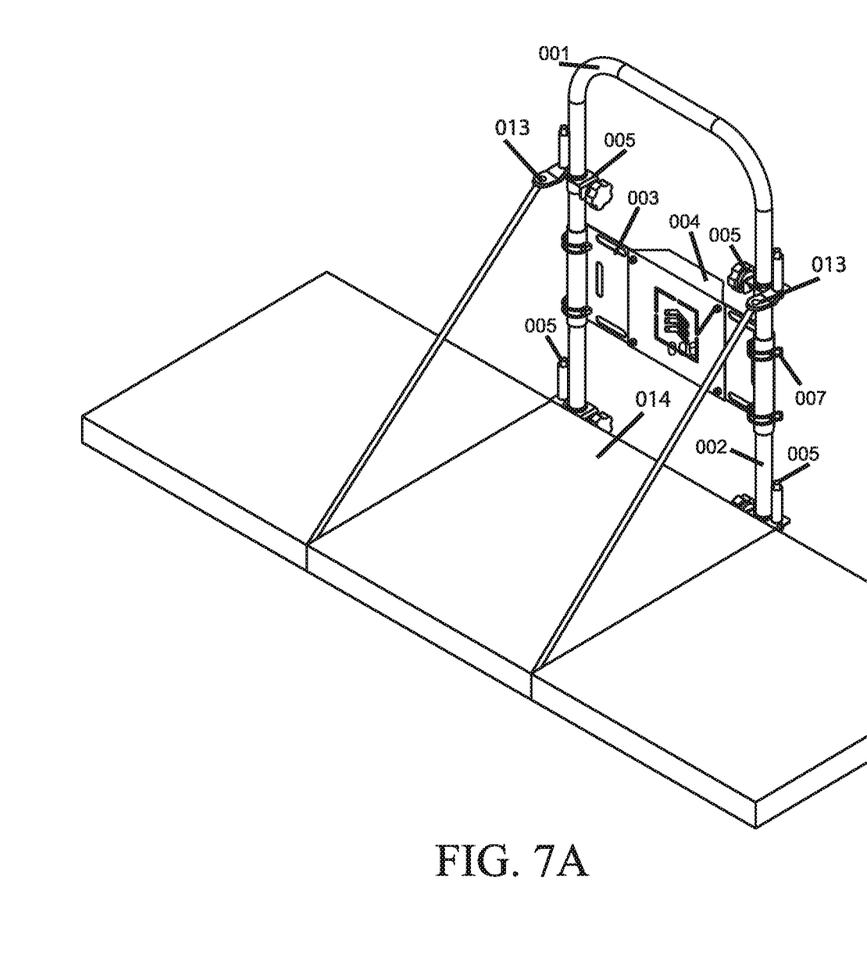
FIG. 7A shows a perspective view of a storage rack embodiment of the present invention, comprising an exemplary selectably stowable and deployable table accessory embodiment of the present invention, in a deployed arrangement.
Figure 7B:
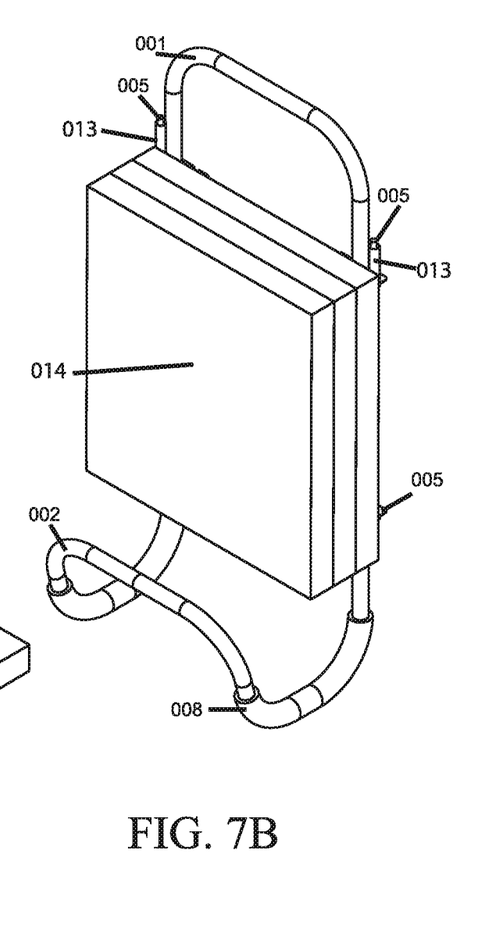
FIG. 7B shows a perspective view of a storage rack embodiment of the present invention, comprising an exemplary selectably stowable and deployable table accessory embodiment of the present invention, in a stowed arrangement.
Figure 8:
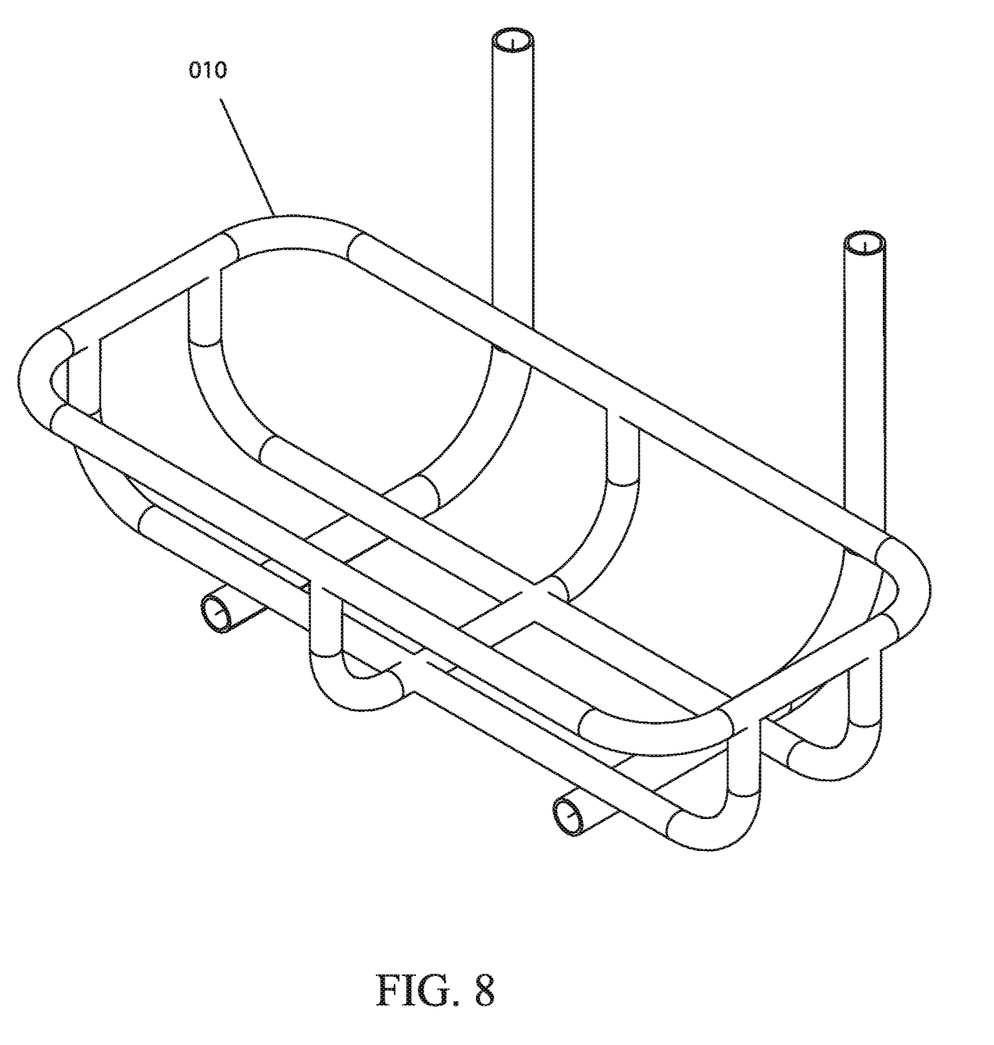
FIG. 8 shows a perspective view of an exemplary accessory bracket of the invention, the bracket comprising a basket.
Figure 9:
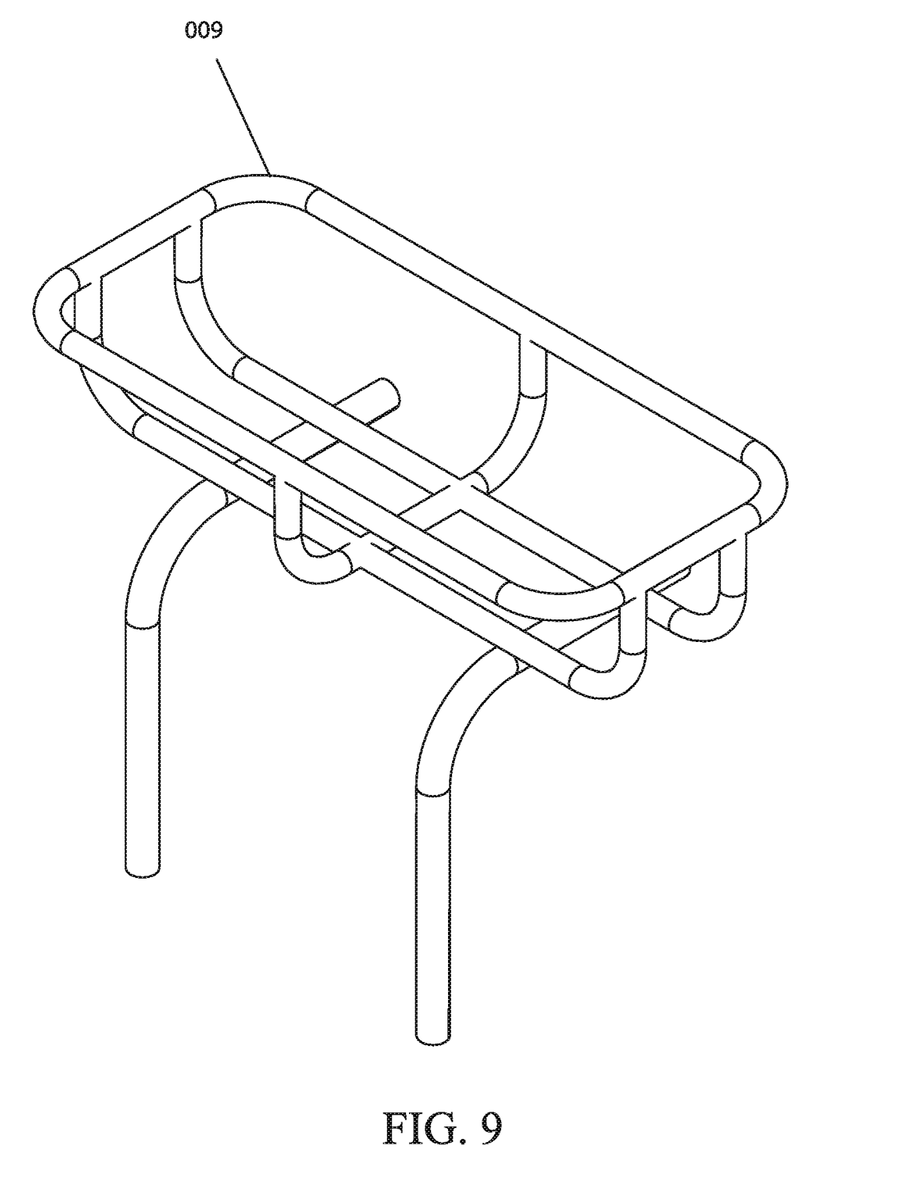
FIG. 9 shows a perspective view of an exemplary accessory bracket of the invention, the bracket comprising a basket.

Referring now to FIGS. 7A and 7B, what are showing are perspective views of one such exemplary accessory, a functional attachment embodiment, an alternately stowable and deployable table bracket 014. The table 014 is in a deployed arrangement in FIG. 7A, and in a stowed arrangement in FIG. 7B.

Referring now to FIG. 7B, the stowed table 014 is held upright, in a similar manner to the container 015 in FIG. 4C. The lower part is supported at the bottom with rail hangers 005 on the lower bracket 002, and the upper part is supported by the rail hangers 005 on the upper accessory bracket 001.

Here (both 7A and 7B), though, instead of the hanging accessory bracket 012 of FIGS. 4B and 4C, the upper part of the table 014 (as defined by its vertical orientation in FIG. 7B) is supported by a tethered-accessory bracket 013.

Referring now to FIG. 7A, the table 014 is supported vertically between its lower and upper edge (again, as defined by the vertical orientation and FIG. 7B) atop the uppermost hook region of lower bracket 002 (obscured in 7A, but in identical position as shown in 7B). The table 014 is also vertically and horizontally supported by the rail hangers 005 on the lower bracket 002 rails, and by the diagonal tension between the upper edge of the table 014 and the hangers 005 on the upper accessory bracket 001, by a tethered accessory bracket 013.

Further contemplated, such as in the case of embodiments in which cargo would obstruct view of the lamp in the cover plate 004 (for example, FIGS. 4B, 4C, and 7C), the interchangeability and rail support on either of upper brackets 001 and 009 (as well as any other bracket which might fit above the mounting boss 003) provides another site to support a lamp at a desired, unobstructed height.

The above described embodiments are merely exemplary and non-limiting and should not be construed as limiting the patentable scope of the present invention, nor the language of the claims.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. An apparatus for mounting to the spare tire mount of a vehicle comprising a spare tire retained to the exterior of the vehicle, comprising:
   a mounting boss configured to be engaged to retaining features of the particular spare tire mount of the particular vehicle without having to contact or be brought into contact with any other part of the vehicle or spare tire, such that it is mountable centrally thereto; and
   an accessory bracket comprising plural parallel vertical rails,
   the mounting boss comprising plural parallel vertical rail mounting tubes on horizontally opposite ends of the mounting boss configured to:
   receive the plural parallel vertical rails,
   the rails being alternately insertably translatable and selectably securable to a desired distance inside the rail mounting tubes;
   such that;
   alternately inserting the rails into the tubes of the mounting boss from above the mounting boss effects an embodiment configured to provide support for accessories to locate them at a height which is above the boss; and
   alternately inserting the rails into the tubes of the mounting boss from below the mounting boss effects an embodiment providing support for accessories below the boss; and
   alternately removing the rails from the mounting boss effects an embodiment which does not extend outwardly from the centrally mounted location of the mounting boss,
   relative to the spare tire;
   at least one rail hanger,
   the rail hanger being one that is alternately translatable and selectably securable to a rail, at a desired distance from the mounting boss, along the length of the rail, and is also configured to be continuously translated along and continuously angularly swiveled about the respective rail; and
   further comprising a vertical accessory support pin;
   such that the accessory support pin is configured to be continuously translated along and continuously angularly swiveled about the respective rail to be alternately secured to and released from any position along the respective rail, and angularly swiveled about the length of the respective rail, between the face of the tire outboard of the horizontal position of the rail and the face of the tire inboard of the horizontal position of the rail, such that securing the rail hanger to the rail securely locates the accessory support pin at a desired distance from the mounting boss and angular offset with respect to the rail.

2. The apparatus of claim 1, further comprising:
   a second accessory bracket having plural parallel rails, each of the rail tubes being assembled and arranged to receive a rail of each of the bracket and second bracket;
   such that each of the brackets are insertably translatable into the rail mounting tubes from opposite directions and selectably securable to a desired distance inside the rail mounting tubes.

3. The apparatus of claim 1, and further comprising:
   a second accessory rail hanger.

4. The apparatus of claim 3, wherein:
   the rail of the first rail hanger and the rail of the second rail hanger are rails of the accessory bracket, such that an accessory can be supported by the first and second rail hangers at equal distance from the same side of the mounting tubes.

5. The apparatus of claim 3, wherein:
   the first rail hanger and second rail hanger are arranged on distinct accessory brackets, and opposite sides, of the same mounting tube.

6. The apparatus of claim 1,
   the accessory bracket being a first bracket and further comprising a second bracket comprising plural parallel vertical rails, wherein:
   the rails of the first bracket and the rails of the second bracket are insertably translatable with respect to top and bottom openings of the tubes on the mounting boss, from opposite directions.

7. The apparatus of claim 1, the rail hanger being a first rail hanger, and further comprising:
   at least one additional rail hanger that is translatable and selectably securable to a rail other than the rail of the first rail hanger, a rail particular to the additional rail hanger, at a desired distance from the mounting boss, along the length of the rail particular to the additional rail hanger, and is also configured to be continuously translated along and continuously angularly swiveled about the respective rail of the additional rail hanger; and
   the additional rail hanger further comprising a vertical accessory support pin;
   such that the accessory support pin of the additional rail hanger is configured to be continuously translated along and continuously angularly swiveled about the respective rail to be alternately secured to and released from any position along the respective rail, and angularly swiveled about the length of the respective rail, between the face of the tire outboard of the horizontal position of the rail and the face of the tire inboard of the horizontal position of the rail, such that securing the additional rail hanger to the respective rail, the rail of the additional rail hanger, securely locates the accessory support pin of the additional rail hanger at a desired distance from the mounting boss and angular offset with respect to the rail, and further comprising at least one pin-supported object configured to be supported by the two rail hangers that are supported on their respective rails, selected from a list comprising a jerry can, panel storage container, and hanging accessory feature configured to receive an equivalent storage object to a jerry can and panel storage container, such that the pin-supported object is configured to predetermine the locations for the rail hangers, to best support for the particular object, such that the pin-supported object is configured to be applied to the pins of the hangers, and be limited from tipping away from the spare tire or swinging or falling laterally off of the apparatus.

* * * * *